(12) United States Patent
Kawazu et al.

(10) Patent No.: US 6,765,721 B2
(45) Date of Patent: Jul. 20, 2004

(54) POLARIZATION ELEMENT AND METHOD FOR MANUFACTURING THE SAME

(75) Inventors: Mitsuhiro Kawazu, Osaka (JP); Hiroaki Yamamoto, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 10/096,042

(22) Filed: Mar. 11, 2002

(65) Prior Publication Data

US 2002/0186469 A1 Dec. 12, 2002

(30) Foreign Application Priority Data

Mar. 12, 2001 (JP) ....................................... 2001-068647

(51) Int. Cl.$^7$ ................................................ G02B 5/30
(52) U.S. Cl. ...................... 359/492; 359/483; 359/485; 156/249; 264/1.31; 264/1.34; 501/56; 501/66
(58) Field of Search ......................... 156/249; 264/1.31, 264/1.34; 359/281, 483, 485, 492; 501/56, 66; 349/96, 122; 427/547, 550

(56) References Cited

U.S. PATENT DOCUMENTS

| | | | |
|---|---|---|---|
| 5,452,122 A | * | 9/1995 | Tsuneda et al. ............. 359/281 |
| 5,943,156 A | * | 8/1999 | Komuro et al. ............. 259/280 |
| 6,313,947 B1 | * | 11/2001 | Takahashi et al. .......... 359/492 |
| 6,444,076 B1 | * | 9/2002 | Herndon et al. ............ 156/249 |

* cited by examiner

Primary Examiner—Audrey Chang
Assistant Examiner—Craig Curtis
(74) Attorney, Agent, or Firm—Crompton, Seager & Tufte, LLC

(57) ABSTRACT

A method for manufacturing a polarization element which has a high reliability and is easy to manufacture. The manufacturing method includes the steps of forming a fine metal particle dispersed product including a plurality of dispersed fine metal particles on a surface of the transparent substrate using a sol-gel method, drawing the fine metal particle dispersed product together with the transparent substrate while heating both, and cutting the drawn fine metal particle dispersed product and transparent substrate. The forming step includes the steps of coating a sol coating liquid on the surface of the transparent substrate, heat-treating the coated sol coating liquid, and sintering the heat-treated sol coating liquid. The sol coating liquid includes a disperse liquid containing an organic silicon compound as a main component and a metal salt dispersed in the disperse liquid for forming the fine metal particles.

30 Claims, 4 Drawing Sheets

POLARIZATION ELEMENT AND METHOD FOR MANUFACTURING THE SAME

BACKGROUND OF THE INVENTION

The present invention relates to a polarization element for use in optical communications, optical recording and optical sensors, and a method for manufacturing the polarization element, and more particularly, to a polarization element which includes a fine metal particle having a shape anisotropy, and a method of manufacturing the same.

A fine particle dispersion including a fine particle having a shape anisotropy, deposited and dispersed in a matrix material, has polarization properties, and is utilized for polarization elements. The shape anisotropy of fine particle is obtained by drawing the fine particle dispersion.

A linear polarizing film, which is a polarization element utilizing the fine particle dispersion, is formed by drawing a resin film containing, for example, iodine and dichromatic pigment (fine particle dispersion) in one direction. The iodine and dichromatic pigment are oriented in a constant direction within the resin film.

An organic compound based linear polarizing film, though it is inexpensive, is fabricated by drawing an organic compound, so that it exhibits a lower durability to heat and abrasion, as compared with an inorganic compound based polarization element.

A polarization element including a fine metal particle dispersion is also known. The fine metal particle dispersion is manufactured, for example, in the following manner. Glass containing halide and silver is heat-treated to deposit and disperse fine silver halide particles in the glass. Subsequently, the glass is heated and drawn to deform the fine silver halide particles into spheroids which are oriented in the direction of the major axis. Next, under a reduction atmosphere, the fine silver halide particles are heated to be reduced to fine silver particles.

However, the polarization element including a fine metal particle dispersion requires a strict temperature management for controlling an aspect ratio (the ratio of the minor axis to the major axis of the spheroids) of the fine silver particles deposited and dispersed in the glass. In addition, resulting polarization element is low in stability of polarization properties.

Specifically, the manufacturing of the foregoing polarization element requires a step of heating fine silver halide particles under a reduction atmosphere to reduce the fine silver halide particles to fine silver particles (hereinafter called a "reduction treatment step") after a step of heating and drawing the fine silver halide particles to provide the same with a shape anisotropy (hereinafter called a "heating/drawing step"). For this reason, the heat applied in the reduction treatment step causes the fine silver particles to again spheroidize. This results in the loss of the shape anisotropy of the fine silver particles, and a deteriorated uniformity of the shape anisotropy (aspect ratio).

Also, when the fine silver halide particles are reduced to fine silver particles in the reduction treatment step, the fine particles are reduced in volume to approximately one-half. This results in a change of the surface of the resulting polarization element into a porous surface. The porous surface scatters incident light to increase the insertion loss of the polarization element. In addition, if moisture in the atmosphere is adsorbed in the porous region of the surface, silver ions are generated. If the polarization element is stained by the silver ions over time, the polarization element fails to provide long-term reliability.

Further, the re-spheroidization of the fine particles will practically limit the processing temperatures in the reduction treatment step. For this reason, the treatment for reducing the fine silver halide particles to the fine silver particles substantially extend to a depth of scores of micrometers from the surface of the glass. This results in residual fine silver halide particles in the glass which do not contribute to the polarization properties. The residual fine silver halide particles increase the insertion loss of the polarization element in addition to the failure in contributing to the polarization properties.

A multi-layer lamination type polarization element is also known. This multi-layer lamination type polarization element is manufactured by using a thin film forming process such as vacuum vapor deposition and sputtering. In this event, several metal layers and dielectric layers are alternately laminated on a glass substrate. Subsequently, the glass substrate is drawn at temperatures higher than the softening point of the glass substrate. At this time, the metal layers are deformed into discontinuous fine metal particle layers oriented in a drawing direction. The polarization properties are obtained by the alternately laminated fine metal particle layers and dielectric layers.

In comparison with the method of manufacturing a polarization element including a fine silver particle dispersion, the method of manufacturing a multi-layer lamination type polarization element is advantageous in terms of the process because of the elimination of the reduction treatment step. However, since the method of manufacturing the multi-layer lamination type polarization element involves the formation of a multi-layer film using a thin film forming process, this method requires a great deal of labor and time, and is not suitable for a reduction in cost. The multi-layer lamination type polarization element is also disadvantageous in that the alternately laminated films are highly susceptible to peeling due to the adhesion of the fine metal particle layers and the dielectric layers.

SUMMARY OF THE INVENTION

It is an object of the present invention to provide a polarization element which has high reliability and is easy to manufacture, and a method of manufacturing the same.

To achieve the above object, the method of manufacturing a polarization element of the present invention includes the steps of forming a fine metal particle dispersed product (fine metal particle dispersed film) including a plurality of dispersed fine metal particles on a surface of the transparent substrate using a sol-gel method, drawing the fine metal particle dispersed product together with the transparent substrate with heating to draw the fine metal particle dispersed product and transparent substrate, and cutting the drawn fine metal particle dispersed product and transparent substrate.

The step of forming a fine metal particle dispersed product includes the steps of coating the surface of the transparent substrate with a sol coating liquid, including a disperse liquid containing an organic silicon compound as a main component and a salt of a first metal dispersed in the disperse liquid for generating the fine metal particles, heat-treating the sol coating liquid coated on the transparent substrate or irradiating with an electromagnetic wave the sol coating liquid coated on the transparent substrate, and sintering the heat-treated sol coating liquid coated on the transparent substrate or the sol coating liquid coated on the transparent substrate irradiated with the electromagnetic wave.

Here, the sol-gel method includes the following steps. A sol containing a metal organic or inorganic compound as a main component is solidified through hydrolysis and condensation polymerization reaction into gel. Next, the gel is sintered to produce an inorganic oxide fine metal particle dispersed product such as glass, ceramic or the like.

The fine metal particle dispersed product produced by using the sol-gel method and the transparent substrate are drawn while heated together to deform fine metal particles in the fine metal particle dispersed product so that the fine metal particles have shape anisotropy.

The method of manufacturing the polarization element using the sol-gel method has the following advantages.

(A) a reduction treatment step is not required after the heating/drawing step. This can simplify the manufacturing process and inhibit the fine metal particles from being spheroidized again.

(B) By sintering the sol coating liquid after applying the sol coating liquid with the heat treatment or electromagnetic wave irradiation processing, fine metal particles are substantially completely deposited and dispersed in the matrix material from a metal salt in the sol coating liquid which is a raw material of the fine metal particles. Thus, substantially all fine metal particles contribute to the polarization properties, thereby making it possible to reduce the insertion loss of the polarization element.

(C) By changing the composition of the sol coating liquid, it is possible to control the particle diameters of the fine metal particles dispersed in the matrix material. Specifically, a metal compound of another metal (second metal) different from the fine metal particles, for example, at least one type of metal selected from the group consisting of zirconium, titanium, cerium, tin, bismuth, cobalt, copper, aluminum, magnesium, manganese, chromium, indium, vanadium, iron, nickel, zinc, tungsten, tantalum, hafnium, barium, ytterbium, niobium, molybdenum, yttrium, ruthenium, germanium, lead and boron is blended in the sol coating liquid, thereby making it possible to control the particle diameters of the fine metal particles dispersed in the matrix material.

By the sol-gel method, the metal compound of the second metal also changes into an inorganic oxide (metal oxide) when fabricating a fine metal particle dispersed product which contains an inorganic oxide as a main component. The second metal oxide acts on the particle diameters of the fine metal particles deposited and dispersed in the matrix material. For example, when fine gold particles are dispersed in a matrix material which contains silicon oxide as a main component, a metal compound of copper, cobalt or titanium may be blended in the sol coating liquid such that 0.1 to 50 mass % of metal compound of copper, cobalt or titanium is contained in the fine metal particle dispersed product, permitting the particle diameters of the fine gold particles to be changed in the range of 10 to 100 nm on the average.

The particle diameters of the fine metal particles dispersed in the matrix material affect the aspect ratios of the fine metal particles in the heating/drawing step, so that they significantly affect the polarization properties of the resulting polarization element. Therefore, the shape anisotropy (aspect ratio) of the fine metal particles can be controlled substantially by controlling the particle diameters of the fine metal particles, and therefore the polarization properties can be efficiently controlled.

(D) A multiplicity of layers of laminated fine metal particle dispersed films can be readily formed without using a thin film forming process such as vacuum vapor deposition and sputtering, and adhesion between the laminated films can be improved. It is therefore possible to reduce a cost of a multi-layer film laminated polarization element.

In addition, since the resulting polarization element has the structure comprised of alternately adhered fine metal particle dispersion, and transparent substrates, rather than the structure comprised of alternately adhered fine metal particle layers and dielectric layers, adhesion between the laminated films can be improved. Particularly, when a fine metal particle dispersion made of a matrix material containing silicon oxide as a main component is fabricated on the surface of a transparent substrate such as glass, adhesion between the laminated films can be further improved.

BRIEF DESCRIPTION OF THE DRAWINGS

The invention, together with objects and advantages thereof, may best be understood by reference to the following description of the presently preferred embodiments together with the accompanying drawings in which:

FIGS. 2A to 2C are schematic diagrams showing a method of manufacturing the polarization element of FIG. 1, wherein

FIGS. 4A to 4C are schematic diagrams showing a method of the polarization element of FIG. 3, wherein

DETAILED DESCRIPTION OF THE PREFERRED EMBODIMENTS

Polarization element

In the following, the polarization element of the present invention will be described in detail.

Matrix Material

The matrix material plays important roles, in addition to the role of a matrix for depositing and dispersing fine metal particles, including ensured adhesion with a transparent substrate, adjustment of temperature and viscosity in the heating/drawing process, adjustment of refractive index with the transparent substrate, and control of particle diameters of the fine metal particles.

The matrix material may be any one which can be applied for the sol-gel method. A main component of the matrix material is preferably silicon oxide. The silicon oxide is easy to use as a matrix material for dispersing and holding fine metal particles. By using a matrix material containing silicon oxide as a main component, fine metal particles can be uniformly dispersed, and the fine metal particles can be densely filled therein. Further, adhesion can be improved between a fine metal particle dispersed film and a transparent substrate.

The matrix material preferably contains a metal oxide of another (second) metal. The metal oxide of another metal specifically includes, at least one type of metal oxide selected from the first group consisting of zirconium oxide, titanium oxide, cerium oxide, tin oxide, bismuth oxide, cobalt oxide, copper oxide, aluminum oxide, magnesium oxide, manganese oxide, chromium oxide, indium oxide, vanadium oxide, iron oxide, nickel oxide, zinc oxide, tungsten oxide, tantalum oxide, hafnium oxide, barium oxide, ytterbium oxide, niobium oxide, molybdenum oxide, yttrium oxide, ruthenium oxide, germanium oxide, lead oxide and boron oxide. More preferably, the matrix material contains at least one type of metal compound selected from the second group consisting of boron oxide, copper oxide, cobalt oxide and titanium oxide in the first group.

The metal oxide of the second metal may include plural types of metal oxides. Also, as the metal oxide of the second metal, those of the second metal added with alkali metal ions, alkaline earth metal ions.

Fine metal particles

The fine metal particles play an important role for obtaining the polarization properties. The polarization properties are controlled by adjusting the type or content of the fine metal particles. Preferably, a metal for the fine metal particles is selected from the group consisting of gold, silver, copper, palladium, platinum, and rhodium. The fine metal particles may include plural types of fine metal particles.

Fine Metal Particle Dispersion

The fine metal particle dispersion (drawn fine metal particle dispersed product) is formed by drawing, while heating, a fine metal particle dispersed film (fine metal particle dispersed product) together with a transparent substrate. Preferably, a plurality of fine metal particle dispersions are laminated on the surface of the transparent substrate. The fine metal particle dispersion may be formed on both opposing surfaces of the transparent substrate.

The polarization properties can be improved by a multiplicity of layers of fine metal particle dispersion. For example, a fine metal particle dispersion in respective layers has different polarizing wavelengths by forming a multiplicity of layers of fine metal particle dispersion having fine metal particles of different aspect ratios. In this case, the polarization element has the polarization properties over a wide wavelength range.

The fine metal particle dispersion preferably contains 1 to 30 mass % of fine metal particles, and more preferably contains 2 to 25 mass % of fine metal particles. When the content of fine metal particles exceeds 30 mass %, an insertion loss of the polarization element increases to degrade the polarization properties. The content of fine metal particles less than 1 mass % will fail to provide effective polarization properties.

The fine metal particle dispersion preferably contains 0.1 to 50.0 mass % of a metal oxide of the second metal, and more preferably contains 0.1 to 40 mass % of the metal oxide of the second metal. When the content of the metal oxide of the second metal exceeds 50 mass %, the particle diameters of the fine metal particles will excessively grow in a matrix material, thereby failing to provide effective polarization properties. The content of the metal oxide of the second metal less than 0.1 mass % will fail to provide fine metal particles which have predetermined particle diameters.

The thickness of the fine metal particle dispersion is preferably 0.2 to 100 μm. If the thickness of the fine metal particle dispersion is smaller than 0.2 μm, light passing through the fine metal particle dispersion will have a short optical path. For this reason, the fine metal particle cannot sufficiently absorb polarized light. If the thickness of the fine metal particle dispersion exceeds 100 μm, a step of coating and drying the sol coating liquid must be repeated a plurality of times when the fine metal particle dispersed film is formed by a sol-gel method.

Manufacturing method

Next, a method of manufacturing a polarization element will be described in detail.

Preparation of Sol Coating Liquid

The sol coating liquid contains a metal salt which is a raw material of fine metal particles, and a dispersion liquid. The dispersion liquid contains a silicon oxide compound as a main component, and the metal salt is dispersed in the dispersion liquid.

The metal salt may be an inorganic compound represented by halides, inorganic acid salts and the like, an organic metal compound represented by organic acid salts, organic acids, organic amines, and the like.

For example, chloroauric acid is preferably used as a metal salt of gold because of its ease of handling. Generally, an inorganic compound such as silver nitrate, and an organic silver compound such as silver naphthenate are preferably used as a metal salt of silver. An inorganic compound such as copper nitrate and copper chloride, an organic acid such as acetic acid, propionic acid, butanoic acid, acrylic acid, methacrylic acid, and stearic acid, or an organic metal compound such as an organic amine modified by an alkanolamine is preferably used as a metal salt of copper.

An inorganic compound such as palladium chloride and palladium nitrate is preferably used as a metal salt of palladium. Inorganic compounds such as chloroplatinic acid, rhodium chloride and rhodium nitrate are preferably used as metal salts of platinum and rhodium.

Alkoxysilane is preferably used as an organic silicon compound of a dispersion liquid. Alkoxysilane may be, for example, tetramethoxysilane, tetraethoxysilane, tetrapropoxysilane, tetrabutoxysilane, and the like. Also, a condensate of each alkoxysilane (n≧2), or a mixture of condensates are also used as appropriate. The condensate to be employable may be, for example, hexaethoxydisiloxane (n=2), octaethoxytrisiloxane (n=3), decaethoxytetrasiloxane (n=4), ethoxypolysiloxane (n≧5), and the like.

For example, Ethyl silicate 40 of a mixture of a monomer (n=1) and a condensate (n≧2) is preferable [the composition is described in pages 253 to 268 of document of J. Cihlar, Colloids and Surfaces A:
Physicochem. Eng. Aspects 70 (1993), and is in percentage by mass a monomer (n=1): 12.8 mass %, dimer (n=2): 10.2 mass %, trimer (n=3): 12.0 mass %, tetramer (n=4): 7.0 mass %, polymer (n≧5): 56.2 mass %, ethanol: 1.8 mass %].

It is also possible to use alkyltrialkoxysilance in which an alkoxy group is replaced with an alkyl group in the compound. Illustrated by way of example may be those in which an alkoxy group is replaced with a straight or branched alkyl group such as a methyl group, an ethyl group, a propyl group, a butyl group, a 2-ethylbutyl group and an octyl group, a cycloalkyl group such as a cyclopentyl group and a cyclohexyl group, an alkenyl group such as a vinyl group, an allyl group, a γ-methacryloxypropyl group, a γ-acryloxypropyl group, an aryl group such as a phenyl group, toluyl group and a xylyl group, an aralkyl group such as benzyl and a phenethyl group, or a γ-mercaptopropyl group, a γ-chloropropyl group, a γ-aminopropyl group, and the like.

Further, the sol coating liquid is preferably blended with a metal compound of the second metal. By adjusting the type or blending amount of the metal compound of the second metal, it is possible to control the particle diameters of fine metal particles deposited and dispersed in a matrix material. It is also possible to control the refractive index and temperature—viscosity characteristic of a fine metal particle dispersion (fine metal particle dispersed film).

Preferably, at least one type of metal selected from the group consisting of zirconium, titanium, cerium, tin, bismuth, cobalt, copper, aluminum, magnesium, manganese, chromium, indium, vanadium, iron, nickel, zinc, tungsten, tantalum, hafnium, barium, ytterbium, niobium, molybdenum, yttrium, ruthenium, germanium, lead and boron is used as the second metal.

When a fine metal particle dispersed film is formed by sintering after applying the sol coating liquid with a heat treatment or electromagnetic wave irradiation processing, a metal oxide of the second metal, specifically, a metal compound which changes to at least one metal oxide selected from the group consisting of zirconium oxide, titanium oxide, cerium oxide, tin oxide, bismuth oxide, cobalt oxide, copper oxide, aluminum oxide, magnesium oxide, manganese oxide, chromium oxide, indium oxide, vanadium oxide, iron oxide, nickel oxide, zinc oxide, tungsten oxide, tantalum oxide, hafnium oxide, barium oxide, ytterbium oxide, niobium oxide, molybdenum oxide, yttrium oxide, ruthenium oxide, germanium oxide, lead oxide and boron oxide is preferably used as a metal compound of the second metal. Specifically, the metal compound of the second metal may be, for example, a metal alkoxide of the second metal, an inorganic compound such as nitrate, chloride or oxide, or an organic metal compound such as an organic acid salt, an organic acid, or an organic amine, and the like.

In the following, metal compounds of titanium, copper, cobalt and boron, particularly suitable for use as a metal compound of the second metal, will be described in more detail.

Organic titanium compounds such as titanium alkoxide, titanium acetylacetonate, and titanium carboxylate are preferably used as a metal compound of titanium. While titanium alkoxide is generally represented by titanium $(OR)_4$ (R is an alkyl group having a carbon number of up to 4), titanium isopropoxide and titanium butoxide are desired in consideration of the reactivity. It has been conventionally known that with titanium, β-diketone complex chelated by acetylacetonate or the like is preferably used due to its stability. In this case, β-diketone alkoxide complex is represented by the general formula: Titatium $(OR)_m L_n$ (in which m+n=4, n ≠0), and L denotes acetylacetone and titanium alkoxide is obtained by chelating titanium alkoxide with a β-diketone complex such as acetyl acetonate. Commercially available titanium acetyl acetonate may be used as the material of titanium oxide.

It is further contemplated to use an organic acid salt such as a salt of acetic acid, propionic acid and acrylic acid. Alternatively, fine titanium oxide particles may be used, for example, in addition to commercially available water dispersion sol such as photocatalyst fine titanium oxide particles manufactured by Ishihara Sangyo Kabushiki Kaisha, Ltd. (trade names, "STS-01" (particle diameter (X-ray particle diameter): 7 nm), "STS-02" (particle diameter (X-ray particle diameter): 7 nm), "CS-N"), titania sol "M-6" (crystal size: 5 nm) manufactured by Taki Chemical Co., Ltd.), a commercially available water and alcohol mixed solvent dispersion titania sol including a binder such as "ST-K01[1]" and "ST-K03" manufactured by Ishihara Sangyo Kabushiki Kaisha may be used.

Inorganic compounds such as nitrate and chloride, an organic acid such as acetic acid, propionic acid, butanoic acid, acrylic acid, methacrylic acid, and stearic acid, or an organic amine modified by an alkanolamine, and the like are preferably used as metal salts of copper and cobalt.

A metal compound of boron suitable for use in this event may be boron allyl oxide, boron n-butoxide, boron ethoxide, boron n-propoxide, boron methoxide, boron methoxyethoxide, boron trimethylsiloxide, boron vinyldimethyl siloxide, and the like.

An organic solvent or the like is preferably blended in the sol coating liquid as necessary for purposes of reducing the viscosity of the sol coating liquid, and the like. The organic solvent is preferably used as conveniently selected in accordance with a particular method of coating the sol coating liquid. For example, as an organic solvent to be employed in the casting method and dip coating method, a solvent having the high evaporation speed is preferably used. The use of a solvent having the low evaporation speed would cause a delay in drying the sol coating liquid, resulting in a high fluidity of the coated sol coating liquid and therefore a failure in forming a uniform film in some cases.

Specific organic solvents suitable for use with the casting method and dip coating method may be, for example, alcohol-based solvents having the high evaporation speed, such as methanol, ethanol, isopropyl alcohol, and tertbutoxy alcohol.

A solvent which evaporates slowly is preferably used as the organic solvent for the gravure coating method, the flexographic printing method, the roll coating method, and the like. When a solvent having the high evaporation speed is used, the solvent will have evaporated before leveling is sufficiently performed, resulting in a poor coating appearance. Here, the evaporation speed of a solvent is generally evaluated in accordance with a relative evaporation speed index, when the evaporation speed of butyl acetate is set at 100. The solvent having the evaporation speed of 40 or less is classified as a solvent which has an extremely slow evaporation speed.

Specific organic solvents suitable for use in the gravure coating method, flexographic printing method and roll coating method may be, for example, ethyl cellosolve, butyl cellosolve, cellosolve acetate, diethylene glycol monoethyl ether, hexylene glycol, diethylene glycol, ethylene glycol, tripropylene glycol, diacetone alcohol, tetrahydrofurfuryl alcohol, and the like.

While a solvent blended in the sol coating liquid desirably contains at least one type of the above-described solvents, a plurality of the solvents may be used in accordance with a particular coating method, the characteristics of the sol coating liquid, a deposition dispersion behavior of fine metal particles, and the like.

Formation of Fine Metal Particle Dispersed Film

The sol coating liquid thus prepared is coated on the surface of a transparent substrate, and the coated sol coating liquid is applied with heat treatment or electromagnetic wave irradiation processing, before it is sintered. This results in the formation of a fine metal particle dispersed film containing fine metal particles deposited and dispersed in a matrix material.

The casting method, dip coating method, gravure coating method, flexographic printing method, roll coating method, spraying method, spin coating method, and the like are preferably used as a method of coating the sol coating liquid. The sol coating liquid may be coated in multiple layers.

The heat treatment is preferably performed at a temperature of 200° C. or higher. When the electromagnetic wave irradiation processing is performed, ultraviolet rays having high energy is preferably used. The sol coating liquid is heated at a temperature of 200° C. to 800° C. for 5 to 200 minutes, or the sol coating liquid is irradiated with ultraviolet rays at a wavelength of 1 to 400 nm with 1 $\mu$W or more for 0.01 to 30 seconds, and the sol coating liquid is further sintered. In this event, a metal salt in the matrix material is reduced, resulting in the deposition and dispersion of substantially spherical isotropic fine metal particles in the matrix material. This results in the formation of a fine metal particle dispersed film which is a fine metal particle dispersed product.

When a fine metal particle dispersed product (fine metal particle dispersed film) containing an inorganic oxide as a main component is formed by a sol-gel method, a metal compound of the second metal changes to an inorganic oxide (metal oxide). The inorganic oxide affects the particle diameters of fine metal particles in the matrix material, the refractive index of the fine metal particle dispersion, or the temperature –viscosity characteristics.

For example, boron oxide reduces the glass transition temperature of the fine metal particle dispersed film (fine metal particle dispersion), and adjusts the temperature—viscosity characteristics of a transparent substrate and the fine metal particle dispersed film (fine metal particle dispersion). Copper oxide, cobalt oxide and titanium oxide affect the particle diameters of fine metal particles. Titanium oxide has a function of adjusting the refractive index, so that the refractive indexes of the fine metal particle dispersion and transparent substrate are adjusted by adjusting the content of titanium oxide.

The particle diameters of the fine metal particles play an important role in a step of providing the fine metal particles with the shape anisotropy. An average particle diameter of the fine metal particles deposited and dispersed in the matrix material is preferably in a range of 10 to 200 nm, more preferably in a range of 15 to 150 nm, and particularly preferably in a range of 30 to 150 nm.

A colored film coated glass plate including fine metal particles deposited and dispersed in a silica matrix, fabricated using a sol-gel method, is reported, for example, in J. Sol-Gel. Sci. Techn. 1, 305 –312 (1994). In this literature, it is reported that the simultaneous occurrence of a fine gold particle growing process and a matrix contraction process in a sol drying step causes an abrupt contraction of the mesh structure of the silica matrix, resulting in partial deposition of fine gold particles on the surface of the film and near the interface with the glass substrate. Technically, this phenomenon is confirmed to have repeated continuity. However, this phenomenon will not degrade the action of the present invention.

Fabrication of Fine Metal Particle Dispersion

After forming a fine metal particle dispersed product (fine metal particle dispersed film) on the surface of the transparent substrate, the fine metal particle dispersed film is drawn, while heating, together with the transparent substrate, causing the deformation of the fine metal particles to have the shape anisotropy.

More specifically, the transparent substrate is heated substantially up to its softening point, and the fine metal particle dispersed film is drawn together with the transparent substrate. In this event, the fine metal particles in the fine metal particle dispersed film is deformed to have an aspect ratio (shape anisotropy) larger than one. The shape of the fine metal particles having the shape anisotropy is a spheroid, the major axis of which is oriented in a direction in which the transparent substrate is drawn. In this case, the aspect ratio indicating the anisotropy is represented by the ratio of the major axis to the minor axis of the spheroid.

When the fine metal particles in the fine metal particle dispersed film contains a material relatively susceptible to oxidization, for example, silver, copper or the like, the heating/drawing step is preferably performed in a reduction atmosphere.

Manufacturing of Polarization Element

By cutting a drawn portion of the transparent substrate resulting from the heating and drawing, a polarization element is provided. As a reference plane of the polarization element is irradiated with light (non-polarized light) from a direction perpendicular to the reference surface of the polarization element, a light component (S-polarized light component) parallel with the major axis of the spheroids (fine metal particles) is absorbed more than a light component (P-polarized light component) perpendicular to the major axis. As a result, the P-polarized light component is emitted from the polarization element, so that the light irradiated to the polarization element is polarized.

For manufacturing a multi-layer laminated polarization element, it can be readily manufactured by performing a step of forming a fine metal particle dispersed film a plurality of times to form a plurality of layers of fine metal particle dispersed films, or by laminating a plurality of transparent substrates each formed with a fine metal particle dispersed film.

Other aspects and advantages of the invention will become apparent from the following description, taken in conjunction with the accompanying drawings, illustrating by way of example the principles of the invention.

In the drawings, like numerals are used for like elements throughout.

First Embodiment

Figure 1:
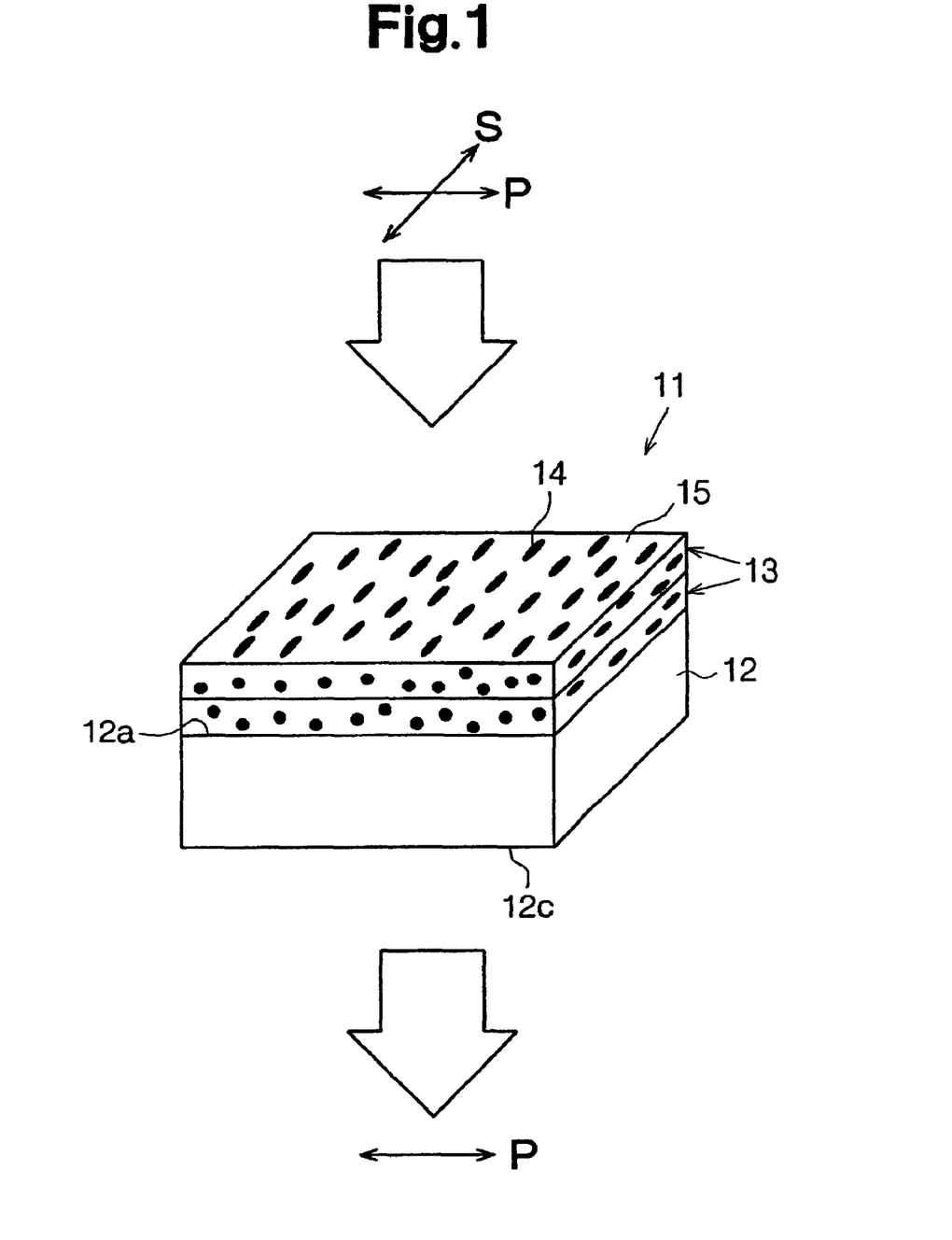
FIG. 1 is a schematic diagram generally showing a polarization element according to a first embodiment of the present invention.

FIG. 1 is a schematic diagram generally showing a polarization element 11 according to a first embodiment of the present invention. As shown in FIG. 1, a plurality (two in FIG. 2) of fine metal particle dispersions 13 are laminated on a surface 12a of a transparent substrate (for example, a glass substrate) 12, which is a reference surface of the transparent substrate. Each fine metal particle dispersion 13 includes a plurality of fine metal particles 14 which are spheroids and have a shape anisotropy. The plurality of fine metal particles 14 are deposited and dispersed in a fine metal particle dispersed product 15.

As the surface 12a is irradiated with light from a direction perpendicular to the surface 12a, the polarization element 11 absorbs more a light component (S-polarization component) parallel with the major axis of the fine metal particles 14 than a light component (P-polarization component) perpendicular to the major axis. Specifically, the polarization element 11 has polarization properties which absorb the S-polarization component of the incident light perpendicular to the reference surface 12a, and transmit the P-polarization component of the same.

Figure 2A:
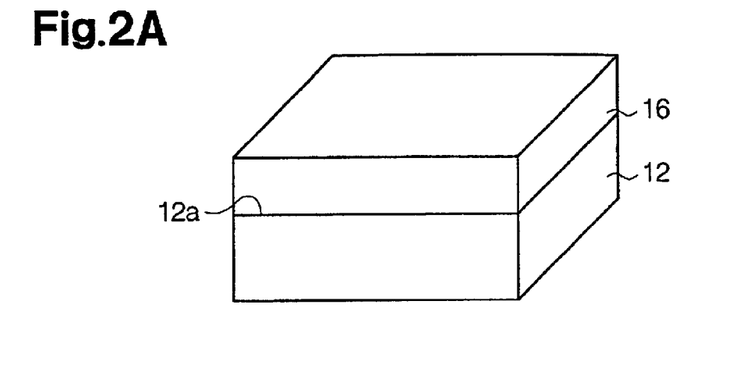
FIG. 2A is a schematic diagram showing that a sol coating liquid is coated on the surface of a transparent substrate.
Figure 2B:
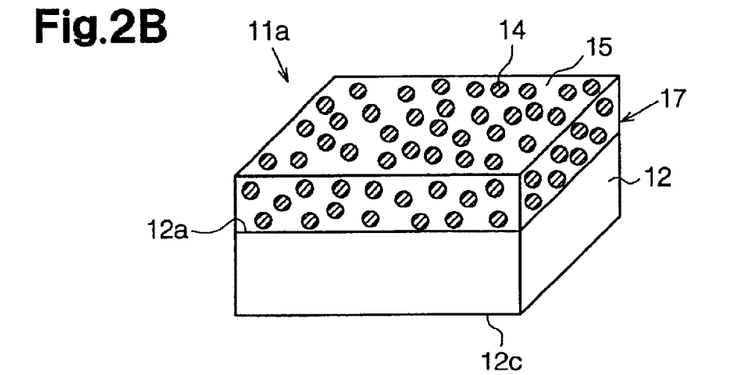
FIG. 2B is a schematic diagram showing that a fine metal particle dispersed film is formed on the transparent substrate.

For manufacturing the polarization element 11, a sol coating liquid 16 is first coated on the surface 12a of the glass substrate 12, as shown in FIG. 2A. Subsequently, the sol coating liquid 16 is treated with heating or electromagnetic wave irradiation and then sintered to form a fine metal particle dispersed film (fine metal particle dispersed product 15) 17 which has fine metal particles 14 deposited and dispersed in a matrix material, as shown in FIG. 2B. A glass base 11a includes the fine metal particle dispersed film 17 and the glass substrate 12.

In this state, the fine metal particles 14 are isotropic and substantially spherical in shape. By repeating a plurality of times the steps shown in FIGS. 2A and 2B, the glass base 11a having two layers of fine metal particle dispersed films 17 is obtained.

Figure 2C:
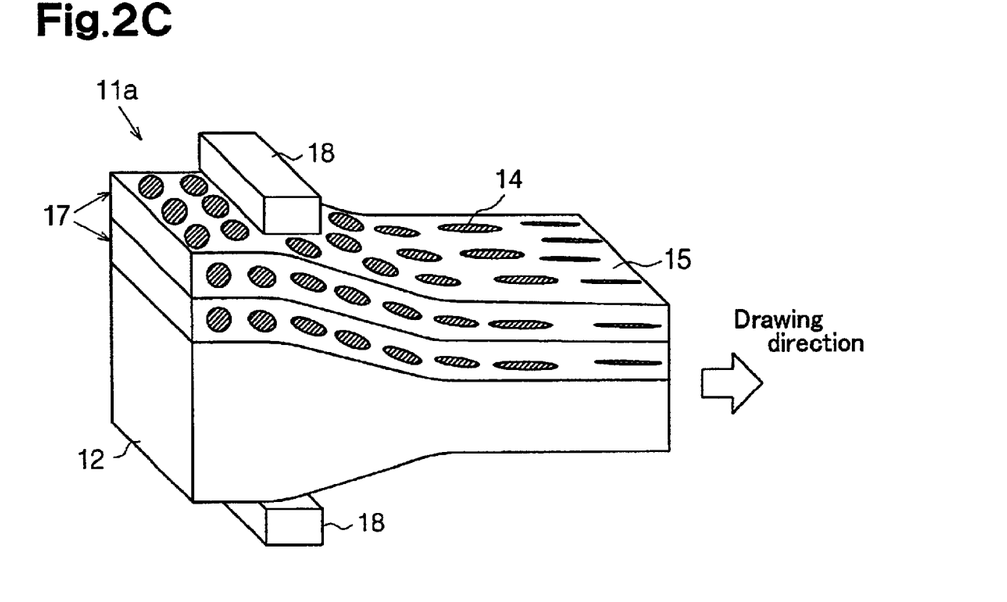
FIG. 2C is a schematic diagram showing a step of preparing a fine metal particle dispersion.

Next, as shown in FIG. 2C, a portion of the glass base 11a is heated substantially to the softening point of the glass substrate 12 by a furnace (heater) 18, and the fine metal particle dispersed films 17 are drawn together with the glass substrate 12 by a drawing machine (not shown). The glass base 11a is drawn, for example, by grabbing both ends of the transparent substrate 12 and stretching the transparent substrate 12 with a tension.

As the glass base 11a is drawn, the fine metal particles 14 within the fine metal particle dispersed film 17 are deformed in shape into spheroids which have the major axes oriented in the drawing direction. As a result, the fine metal particles 14 have a shape anisotropy. The cross-sectional shape of the spheroids in the minor axis direction is analogous to the cross-sectional shape of the fine metal particles 14 before they are heated and drawn.

As the glass base 11a is drawn, the fine metal particle dispersion 13 including a plurality of fine metal particles 14 having the shape anisotropy are formed on the surface 12a of the glass substrate 12. After cooling down the glass base 11a, the drawn portion of the glass base 11a is cut to provide the polarization element 11 of FIG. 1.

Second Embodiment

Figure 3:
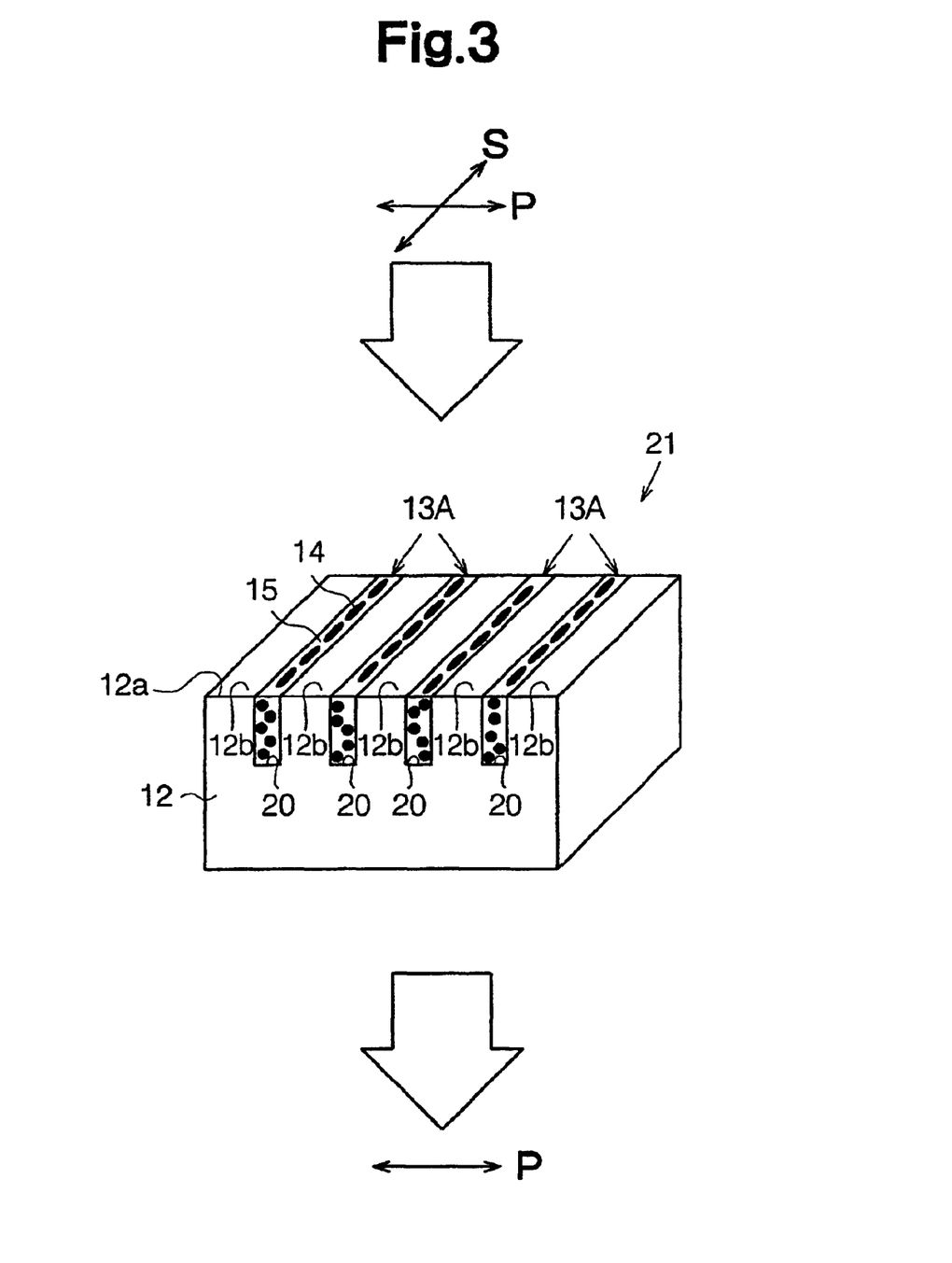
FIG. 3 is a schematic diagram generally showing a polarization element according to a second embodiment of the present invention.

FIG. 3 is a schematic diagram generally showing a polarization element 21 according to a second embodiment of the present invention. As shown in FIG. 3, a plurality of recesses 20 are formed as stripes on a surface 12a of a glass substrate 12 in the second embodiment.

The plurality of recesses 20 are formed at predetermined intervals substantially perpendicular to a direction in which light is incident thereon. Each recess 20 is formed with a fine metal particle dispersion 13A which includes fine metal particles 14 that are spheroids and have a shape anisotropy.

The interval between the respective recesses is preferably 0.1 $\mu$m to 5.0 $\mu$m. The depth of each recess is preferably 0.5 $\mu$m to 1000 $\mu$m, and more preferably 1.0 $\mu$m to 500 $\mu$m.

Walls 12b of the transparent substrate adjacent to the respective recesses cause such phenomena as scattering, interference and so on of light. When the recesses are formed at intervals less than 0.1 $\mu$m, an insertion loss of the polarization element 21 increases, whereas when the recesses are formed at intervals larger than 5.0 $\mu$m, incident light will scatter to increase the insertion loss.

The depth of the recesses is related to the length of an optical path of passing light. When the depth of the recesses is less than 0.5 $\mu$m, polarized light will not be sufficiently absorbed, whereas when the depth of the recesses is larger than 1000 $\mu$m, the insertion loss will increase.

As light is incident on the surface 12a from a direction perpendicular to the surface 12a, the polarization element 21 absorbs more a light component (S-polarization component) parallel with the major axis of the fine metal particles 14 than a light component (P-polarization component) perpendicular to the major axis. Specifically, the polarization element 21 has polarization properties which absorb the S-polarization component of the incident light perpendicular to the reference surface 12a and transmit the P-polarization component of the same.

For manufacturing the polarization element 21, a plurality of recesses 20 parallel to one another are first formed on the surface 12a of the transparent substrate 12. Preferably, the recesses 20 may be formed for example by an exposure technology such as photolithography, an electron beam drawing technology, a laser drawing technology, a laser based bi-flux interference exposure technology, laser abrasion, and the like.

Figure 4A:
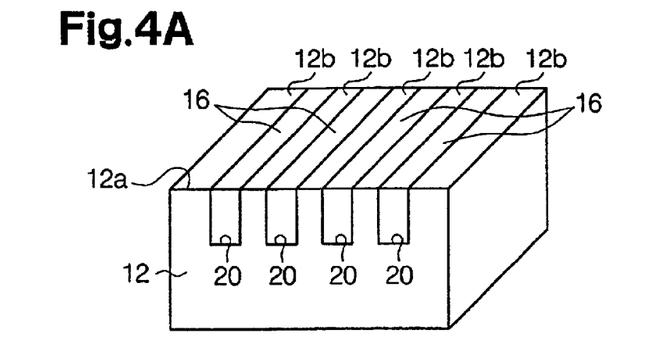
FIG. 4A is a schematic diagram showing that a sol coating liquid is coated in a recess on the surface of a transparent substrate.
Figure 4B:
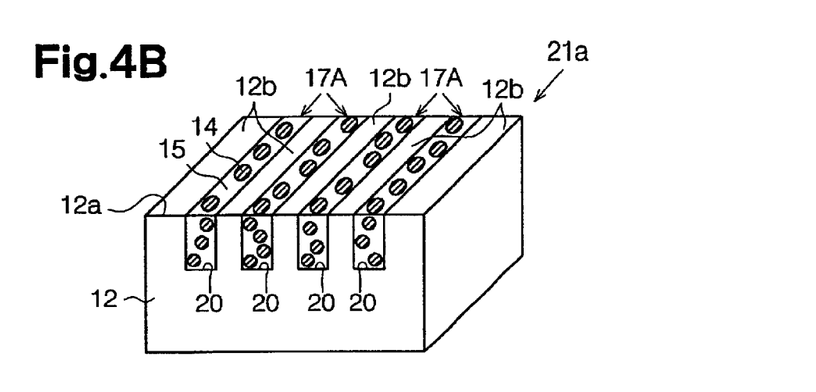
FIG. 4B is a schematic diagram showing that a fine metal particle dispersed film is formed on the transparent substrate.

Next, as shown in FIG. 4A, a sol coating liquid 16 is coated and filled in each recess 20, and the coated sol coating liquid 16 is treated with heating or electromagnetic wave irradiation, and then is sintered. Consequently, as shown in FIG. 4B, a fine metal particle dispersed film 17A including fine metal particles 14 deposited and dispersed in a matrix material is formed in each recess 20. A glass base 21a contains the fine metal particle dispersed film 17A formed in each recess 20, and the transparent substrate 12. In this state, the fine metal particles 14 are isotropic and substantially spherical in shape.

Figure 4C:
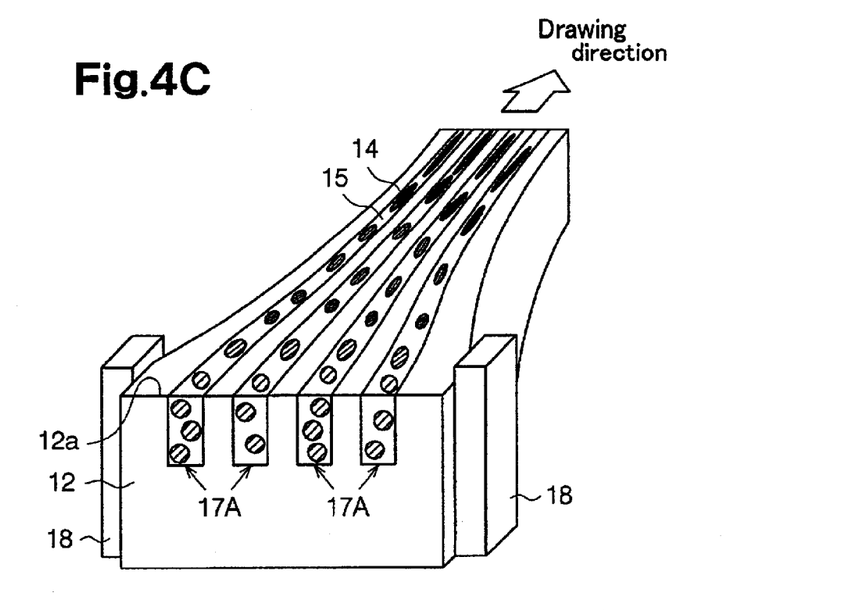
FIG. 4C is a schematic diagram showing a step of creating a fine metal particle dispersion.

Next, as shown in FIG. 4C, a portion of the glass base 21a is heated substantially up to the softening point of the transparent substrate 12 by a furnace 18, and the fine metal particle dispersed films 17A are drawn together with the transparent substrate 12 using a drawing machine (not shown). In this event, the glass base 21a is drawn in the longitudinal direction of the respective recesses 20. Therefore, the fine metal particles 14 can be more effectively provided with the shape anisotropy.

Specifically, when the glass base 21a is drawn in the longitudinal direction of the respective recesses 20, a stress acts on the glass base 21a. This stress narrows down the width of each recess 20 and the intervals between the respective recesses 20, thereby further increasing a stress which acts on the fine metal particles 14 in the drawing direction. As a result, with a smaller drawing force as compared with the glass base 11a in the first embodiment, the fine metal particles 14 can be effectively deformed in shape. The fine metal particles 14 in the fine metal particle dispersed films 17A after heating and drawing are spheroidal in shape, where the spheroids have the major axis oriented in the drawing direction.

As the glass base 21a is drawn, each of the recesses 20 in the glass substrate 12 is formed with a fine metal particle dispersion 13 which includes a plurality of fine metal particles 14 having the shape anisotropy. After cooling the glass base 21a, the drawn portion of the glass base 21a is cut to provide the polarization element 21 of FIG. 3.

EXAMPLES AND COMPARATIVE EXAMPLES

In the following, each of the foregoing embodiments will be described in more specific manner, referring to several examples and comparative examples. Such examples and comparative examples will not at all limit the scope of the present invention.

First, in a sol coating liquid, a silicon oxide stock solution which has an organic silicon compound dispersed in a solvent is prepared, and a metal salt which is a raw material of fine metal particles is blended in the silicon oxide stock solution. When a metal compound of a second metal is blended in the sol coating liquid, a metal oxide stock solution having a metal compound of the second metal dispersed in a solvent is prepared, and the prepared metal oxide stock solution is blended in the silicon oxide stock solution.

The polarization properties of a polarization element are evaluated using an extinction ratio. For calculating the extinction ratio, a sample is irradiated with linear polarized light to measure a transmittance (Ts %) when the polarizing plane of the irradiated light is in parallel with the major axis of spheroids (fine metal particles), and a transmittance (Tp %) when the polarizing plane of the irradiated light is perpendicular to the major axis of the spheroids. The extinction ratio is calculated by the following equation:

Extinction Ratio=$10\log_{10}(Tp/Ts)$

Example 1

A BK7 glass (borosilicate glass manufactured by Schott Co.) substrate of 100 mm×100 mm ×2.1 mm was used. On the surface of the BK7 glass substrate, a fine metal particle dispersion including fine gold (Au) particles (fine metal particles having a shape anisotropy) deposited and dispersed in a silicon oxide ($SiO_2$) matrix material was fabricated using a sol-gel method.

First, 6 g of 0.01 mol/l (0.01 N) hydrochloric acid and 91.4 g of isopropyl alcohol (IPA) were added to 50 g of methyltriethoxysilane (organic silicon compound), and stirred at room temperature for two hours to prepare a silicon oxide stock solution. The proportion of a solid converted to $SiO_2$ to the silicon oxide stock solution is 11.4 mass %. 2.0 g of chloroauric acid (metal salt) and 50.2 g of IPA (solvent) were blended in 47.8 g of silicon oxide stock solution to prepare a sol coating liquid.

Next, as shown in FIG. 2A, the sol coating liquid was dip coated on the surface of the BK7 glass substrate. After air-drying the sol coating liquid, it was treated with heating at 250° C. for two hours, and sintered at 580° C. for 30 minutes to form a matrix body (fine metal particle dispersed film) including fine metal particles deposited and dispersed in the $SiO_2$ matrix material, as shown in FIG. 2B. The film forming step was repeated ten times to obtain a glass base laminated with the fine metal particle dispersed film.

The composition of a metal oxide and fine metal particles in the fine metal particle dispersed film was as follows. $SiO_2$ is 85.0 mass %, and Au is 15.0 mass %. An observation on the structure of the fine metal particle dispersed film by using a transmission electron microscope (hereinafter called the "TEM") confirmed that substantially spherical isotropic fine metal particles having an average particle diameter of approximately 6 nm were deposited and dispersed in the $SiO_2$ matrix material.

Next, a glass base having the size of 100×20×2.1 mm was cut from the glass base laminated with the fine metal particle dispersed film, and a base material was prepared before heating and drawing. As shown in FIG. 2C, a portion of the base material was heated to 625° C. by a resistive heating electric heater to draw the portion of the base material by 30 mm at an initial load of 16.4 N/mm². The drawing direction was chosen to be a direction parallel with the side of the base material having the length of 100 mm. After cooling, a base material having a length of approximately 9.4 mm was cut from the drawn portion to obtain a polarization element (see FIG. 1) of 9.4 mm in length×9.4 mm in width×0.99 mm in thickness in size.

In the polarization properties of the polarization element, the extinction ratio at wavelength of 630 nm was 6 dB, and the insertion loss was 1.2 dB. A TEM observation confirmed that the aspect ratio (the ratio of the minor axis to the major axis of the spheroid) of the fine metal particles of Example 1 was 1:1.2. No peeling was recognized at all between laminated films.

Example 2

On the surface of the same glass substrate as Example 1, a fine metal particle dispersion including fine gold (Au) particles deposited and dispersed in a silicon oxide/copper oxide ($SiO_2$/CuO) matrix material was fabricated using a sol-gel method.

First, 9 g of 0.1 mol/l (0.1 N) hydrochloric acid and 119.4 g of IPA were added to 50 g of ethyl silicate ("Ethyl silicate 40" manufactured by Colcoat Co.) (organic silicon compound), and stirred at room temperature for 2 hours to prepare a silicon oxide stock solution. The proportion of a solid converted to $SiO_2$ to the silicon oxide stock solution is 11.4 mass %.

Dimethylformamide (DMF) was added to copper nitrate 3hydrate (metal compound of the second metal) to prepare a copper oxide stock solution (metal oxide stock solution). The proportion of a solid converted to CuO to the copper oxide stock solution is 11.4 mass %. 2.0 g of chloroauric acid (metal salt) and 50.2 g of IPA (solvent) were blended in a mixture of 43.4 g of silicon oxide stock solution and 4.4 g of copper oxide stock solution to prepare a sol coating liquid.

Next, after the sol coating liquid was dip coated on the surface of the glass substrate, a similar treatment to Example 1 was performed to form a fine metal particle dispersed film including fine metal particles deposited and dispersed in the $SiO_2$/CuO matrix material. The film forming step was repeated ten times to obtain a glass base laminated with the fine metal particle dispersed film.

The composition of metal oxides and fine metal particles in the fine metal particle dispersed film was as follows. $SiO_2$ is 77.2 mass %, CuO is 7.80 mass %, and Au is 15.0 mass %. A TEM observation confirmed that substantially spherical isotropic fine metal particles having an average particle diameter of approximately 40 nm were deposited and dispersed in the $SiO_2$/CuO matrix material.

Next, a base material was cut from the glass base, and the base material was drawn with heating to fabricate a fine metal particle dispersion in a manner similar to Example 1. After cooling, a drawn portion of the base material was cut to obtain a polarization element as shown in FIG. 1.

In the polarization properties of the polarization element, the extinction ratio at wavelength of 960 nm was 35 dB, and the insertion loss was 0.1 dB. A TEM observation confirmed that the aspect ratio of the fine metal particles of Example 2 was 1:6. No peeling was recognized at all between laminated films.

Example 3

On the surface of the same glass substrate as Example 1, a fine metal particle dispersion containing fine gold (Au) particles deposited and dispersed in a silicon oxide/titanium oxide ($SiO_2$/$TiO_2$) matrix material was fabricated using a sol-gel method.

The same silicon oxide stock solution as Example 2 was used. 2 mols of acetylacetone was added dropwise with a dropping funnel to 1 mol of titanium isopropoxide (metal compound of the second metal) under stirring, and the resulting mixture was diluted with IPA to prepare a titanium oxide stock solution (metal oxide stock solution) The proportion of a solid converted to $TiO_2$ to the titanium oxide stock solution is 11.4 mass %. 2.0 g of chloroauric acid (metal salt) and 50.2 g of IPA (solvent) were blended in a mixture of 43.4 g of silicon oxide stock solution and 4.4 g of titanium oxide stock solution to prepare a sol coating liquid.

Next, after the sol coating liquid was dip coated on the surface of the glass substrate, a similar treatment to Example 1 was performed to form a fine metal particle dispersed film containing fine metal particles deposited and dispersed in the $SiO_2/TiO_2$ matrix material. The film forming step was repeated ten times to obtain a glass base laminated with the fine metal particle dispersed film.

The composition of metal oxides and fine metal particles in the fine metal particle dispersed film was as follows. $SiO_2$ is 77.2 mass %, $TiO_2$ is 7.80 mass %, and Au is 15.0 mass %. A TEM observation confirmed that substantially spherical isotropic fine metal particles having an average particle diameter of approximately 16 nm were deposited and dispersed in the $SiO_2/TiO_2$ matrix material.

Next, a base material was cut from the glass base, and the base material was drawn with heating to fabricate a fine metal particle dispersion in a similar manner to Example 1. After cooling, a drawn portion of the base material was cut to obtain a polarization element as shown in FIG. 1.

In the polarization properties of the polarization element, the extinction ratio at a wavelength of 630 nm was 18 dB, and the insertion loss was 1.2 dB. A TEM observation confirmed that the aspect ratio of the fine metal particles of Example 3 was 1:1.5. No peeling was recognized at all between the laminated films.

Example 4

On the surface of the same glass substrate as Example 1, a fine metal particle dispersion containing fine gold (Au) particles deposited and dispersed in a silicon oxide/cobalt oxide $(SiO_2/CoO)$ matrix material was fabricated using a sol-gel method.

First, 7.52 g of 0.1 mol/l (0.1 N) nitric acid and 55.04 g of IPA were added to 62.6 g of ethyl silicate ("Ethyl silicate 40" manufactured by Colcoat Co.: organic silicon compound), followed by stirring at room temperature for two hours. Subsequently, 14.64 g of methyltriethoxisilane, 58.26 g of IPA, and 1.8 g of 0.1 mol/l (0.1 N) nitric acid were added, followed by stirring at room temperature for two hours. Next, IPA was added as a solvent to prepare a silicon oxide stock solution. The proportion of a solid converted to $SiO_2$ to the silicon oxide stock solution was set to 11.4 mass %. 10 g of cobalt chloride 6hydrate (metal compound of the second metal) was dissolved in 40 g of IPA to prepare a cobalt oxide stock solution (metal oxide stock solution). 3.0 g of chloroauric acid (metal salt) and 60.2 g of IPA (solvent) were blended in a mixture of 33.0 g of silicon oxide stock solution and 3.73 g of cobalt oxide stock solution to prepare a sol coating liquid.

Next, the sol coating liquid was dip coated on the surface of the glass substrate. After air-drying the sol coating liquid, it was treated with heating at 250° C. for 2.5 hours, and sintered at 550° C. for five minutes to form a fine metal particle dispersed film consisting of fine metal particles deposited and dispersed in the $SiO_2/CoO$ matrix material. The film forming step was repeated ten times to obtain a glass base laminated with the fine metal particle dispersed film.

The composition of metal oxides and fine metal particles in the fine metal particle dispersed film was as follows. $SiO_2$ is 69.4 mass %, CoO is 4.33 mass %, and Au is 26.3 mass %. A TEM observation confirmed that substantially spherical isotropic fine metal particles having an average particle diameter of approximately 23 nm were deposited and dispersed in the $SiO_2/CoO$ matrix material.

Next, a base material was cut from the glass base, and the base material was drawn with heating to fabricate a fine metal particle dispersion in a similar manner to Example 1. After cooling, a drawn portion of the base material was cut to obtain a polarization element as shown in FIG. 1.

In the polarization properties of the polarization element, the extinction ratio at a wavelength of 670 nm was 22 dB, and the insertion loss was 0.6 dB. A TEM observation confirmed that the aspect ratio of the fine metal particles of Example 4 was 1:1.8. No peeling was recognized at all between the laminated films.

Example 5

On the surface of the same BK7 glass substrate as Example 1, a plurality of recesses were formed as stripes as shown in FIG. 3. A fine metal particle dispersion containing fine gold (Au) particles deposited and dispersed in a silicon oxide/copper oxide $(SiO_2/CuO)$ matrix material was fabricated in each of the recesses using a so-gel method.

Each of the recesses has a depth of 5 μm, a line (length) of 0.5 pm (at a pitch of 1 μm) and a space (interval) of 0.5 μm. A photolithographic technology was used to fabricate the recesses.

The same sol coating liquid as Example 2 was used. The sol coating liquid was spin coated on the surface of the glass substrate at a rotational speed of 1500 $min^{-1}$. After air-drying the sol coating liquid, it was treated with heating at 250° C. for two hours, and sintered for thirty minutes at 580° C. to form a fine metal particle dispersed film containing fine metal particles deposited and dispersed in the $SiO_2/Cuo$ matrix material.

The composition of metal oxides and fine metal particles in the fine metal particle dispersed film was as follows. $SiO_2$ is 77.2 mass %, CuO is 7.80 mass %, and Au is 15.0 mass %. A TEM observation confirmed that substantially spherical isotropic fine metal particles having an average particle diameter of approximately 40 nm were deposited and dispersed in the $SiO_2/CuO$ matrix material.

Next, a base material having a size of 100×20×2.1 mm was cut from the glass base laminated with the fine metal particle dispersed film, and a base material was prepared before heating and drawing. The glass base was cut in a direction parallel with the stripes in FIG. 3.

Next, as shown in FIG. 4C, a portion of the base material was heated to 625° C. by a resistive heating electric heater to draw the base material by 30 mm at an initial load of 16.4 $N/mm^2$. The drawing direction was chosen to be a direction parallel with the side of the base material having the length of 100 mm, and the direction parallel with the stripes. After cooling, a base material having a length of approximately 9.4 mm was cut from the drawn portion to obtain a polarization element (see FIG. 3) having a size of 9.4 in length× 9.4 in width ×0.99 mm in thickness.

In the polarization properties of the polarization element, the extinction ratio at a wavelength of 1300 nm was 48 dB, and the insertion loss was 0.05 dB. A TEM observation confirmed that the aspect ratio of the fine metal particles of Example 5 was 1:8.

Example 6

On the surface of the same BK7 glass substrate as in Example 5, a plurality of recesses were formed as stripes as shown in FIG. 3. A fine metal particle dispersion containing fine gold (Au) particles deposited and dispersed in a silicon oxide/titanium oxide ($SiO_2/TiO_2$) matrix material was fabricated in each of the recesses using a so-gel method.

First, 7.52 g of 0.1 mol/l (0.1 N) nitric acid and 55.04 g of ethyl cellosolve (EC) were added to 62.6 g of ethyl silicate ("Ethyl silicate 40" manufactured by Colcoat Co.: organic silicon compound), and the mixture was stirred at room temperature for two hours. Subsequently, 14.64 g of methyltriethoxysilane, 58.26 g of EC, and 1.8 g of 0.1 mol/l (0.1 N) nitric acid were further added, followed by stirring at room temperature for two hours. Next, EC (solvent) was added to prepare a silicon oxide stock solution.

The proportion of a solid converted to $SiO_2$ to the silicon oxide stock solution was set to 15.2 mass %. Fine titanium oxide particles having a photocatalyst activity (metal compound of the second metal: trade name "STS-02" manufactured by Ishihara Sangyo Kaisha, Ltd. (average particle diameter is approximately 7 nm, $TiO_2$ solid content: 30 mass %) was diluted with EC to prepare a titanium oxide stock solution (metal oxide stock solution).

The proportion of a solid content converted to $TiO_2$ to the titanium oxide stock solution is set to 15.2 mass %. 1.6 g of chloroauric acid (metal salt), 6 g of EC, and 10 g of ethylene glycol were blended in a mixture of 21.2 g of silicon oxide stock solution and 1.33 g of titanium oxide stock solution to prepare a sol coating liquid.

Next, the sol coating liquid was gravure coated on the surface of the glass substrate formed with recesses. After air-drying the sol coating liquid, it was treated with heating at 250° C. for 2.5 hours, and sintered at 580° C. for 30 minutes to form a fine metal particle dispersion film containing fine metal particles deposited and dispersed in the $SiO_2/TiO_2$ matrix material.

The composition of metal oxides and fine metal particles in the fine metal particle dispersed film was as follows. $SiO_2$ is 73.3 mass %, $TiO_2$ is 9.12 mass %, and Au is 17.6 mass %. A TEM observation confirmed that substantially spherical isotropic fine metal particles having an average particle diameter of approximately 23 nm were deposited and dispersed in the $SiO_2/TiO_2$ matrix material.

Next, a base material was cut from the glass base, and the base material was drawn with heating in a similar manner to Example 5. After cooling, a drawn portion of the base material was cut to obtain a polarization element as shown in FIG. 3.

In the polarization properties of the polarization element, the extinction ratio at a wavelength of 800 nm was 35 dB, and the insertion loss was 0.03 dB. A TEM observation confirmed that the aspect ratio of the fine metal particles of Example 6 was 1:3.8.

Example 7

In Example 7, a polarization element was fabricated by a similar method to Example 6 except that the blending composition of the sol coating liquid was changed and, a method of coating the sol coating liquid and conditions for the heat treatment were changed.

The same silicon oxide stock solution and titanium oxide stock solution as in Example 6 were used. 1.0 g of ethylene glycol, 0.24 g of chloroauric acid (metal salt), and 1.85 g of ethyl cellosolve were blended in a mixture of 3.95 g of silicon oxide stock solution and 0.80 g of titanium oxide stock solution to prepare a sol coating liquid.

The sol coating liquid was spin coated at a rotational speed of 1500 $min^{-1}$ on the surface of the glass substrate formed with recesses. After air-drying the sol coating liquid, it was treated with heating at 250° C. for 2.5 hours, and sintered at 580° C. for 30 minutes to form a fine metal particle dispersed film including fine metal particles deposited and dispersed in the $SiO_2/TiO_2$ matrix material.

The composition of metal oxides and fine metal particles in the fine metal particle dispersed film was as follows. $SiO_2$ is 71.7 mass %, $TiO_2$ is 14.5 mass %, and Au is 13.8 mass %. A TEM observation confirmed that substantially spherical isotropic fine metal particles having an average particle diameter of approximately 25 nm were deposited and dispersed in the $SiO_2/TiO_2$ matrix material.

Next, a base material was cut from the glass base, and the base material was drawn with heating in a similar manner to Example 6. After cooling, a drawn portion of the base material was cut to obtain a polarization element as shown in FIG. 3.

In the polarization properties of the polarization element, the extinction ratio at a wavelength of 800 nm was 45 dB, and the insertion loss was 0.08 dB. A TEM observation confirmed that the aspect ratio of the fine metal particles of Example 7 was 1:4.

Example 8

In Example 8, a polarization element was fabricated by a similar method to Example 6 except that the blending composition of the sol coating liquid was changed, and a method of coating the sol coating liquid and conditions for the heat treatment were changed.

The same silicon oxide stock solution and titanium oxide stock solution as in Example 6 were used. 10.0 g of ethylene glycol, 1.6 g of chloroauric acid (metal salt), and 3.1 g of ethyl cellosolve were blended in a mixture of 21.1 g of silicon oxide stock solution and 4.26 g of titanium oxide stock solution to prepare a sol coating liquid.

The sol coating liquid was gravure coated on the surface of the glass substrate formed with recesses. After air-drying the sol coating liquid, it was treated with heating at 250° C. for 2 hours, and sintered at 580° C. for 30 minutes to form a fine metal particle dispersed film including fine metal particles deposited and dispersed in the $SiO_2/TiO_2$ matrix material.

The composition of metal oxides and fine metal particles in the fine metal particle dispersed film was as follows. $SiO_2$ is 61.1 mass %, $TiO_2$ is 24.3 mass %, and Au is 14.6 mass %. A TEM observation confirmed that substantially spherical isotropic fine metal particles having an average particle diameter of approximately 28 nm were deposited and dispersed in the $SiO_2/TiO_2$ matrix material.

Next, a base material was cut from the glass base, and the base material was drawn with heating in a similar manner to Example 6. After cooling, a drawn portion of the base material was cut to obtain a polarization element as shown in FIG. 3.

In the polarization properties of the polarization element, the extinction ratio at a wavelength of 950 nm was 29 dB, and the insertion loss was 0.9 dB. A TEM observation confirmed that the aspect ratio of the fine metal particles of Example 8 was 1:5.2.

Example 9

Using the same glass substrate as in Example 1, a fine metal particle dispersion containing fine silver (Ag) particles deposited and dispersed in a silicon oxide/titanium oxide ($SiO_2/TiO_2$) matrix material was fabricated on the surface of the glass substrate using a sol-gel method.

First, 7.52 g of 0.1 mol/l (0.1 N) nitric acid and 55.04 g of IPA were added to 62.6 g of ethyl silicate ("Ethyl silicate 40" manufactured by Colcoat Co.: organic silicon compound), and the mixture was stirred for two hours at room temperature. Subsequently, 14.64 g of methyltriethoxysilane, 58.26 g of IPA, and 1.8 g of 0.1 mol/1 (0.1 N) nitric acid were further added, followed by stirring at room temperature for two hours. Then, IPA was added as a solvent to prepare a silicon oxide stock solution. The proportion of a solid content converted to $SiO_2$ to the silicon oxide stock solution was set to 11.4 mass %.

2 mols of acetylacetone was added dropwise into 1 mol of stirred titanium isopropoxide (metal compound of the second metal) by a dripping funnel, and the resulting product was diluted with IPA to prepare a titanium oxide stock solution (metal oxide stock solution). The proportion of a solid content converted to $TiO_2$ to the titanium oxide stock solution is 11.4 mass %.

Silver nitrate (metal salt) was mixed with ethylene glycol for adjustment to contain 20 mass % of silver nitrate, to prepare a fine silver particle stock solution, which was a raw material of fine silver particles. 10.2 mass % of fine silver particle stock solution and 27.5 g of IPA (solvent) were blended in a mixture of 52.64 g of silicon oxide stock solution and 9.67 g of titanium oxide stock solution to prepare a sol-gel coating liquid.

The sol coating liquid was dip coated on the surface of the glass substrate, as shown in FIG. 2A. After air-drying the sol coating liquid, the sol coating liquid was irradiated with ultraviolet rays having a center wavelength of 365 nm for approximately 30 seconds using an ultraviolet (UV) irradiation device (model number: UV-402/1HNSC9-AA01) manufactured by USHIO Co. from approximately 20 cm above the surface of the glass substrate. The intensity of the ultraviolet rays was measured at an irradiated position using a photocurrent measuring device (UIT-100 manufactured by Ushio Co.) to obtain the value of 10 mW/cm².

Subsequently, sintering at 550° C. for five minutes resulted in the formation of a fine metal particle dispersed film containing fine metal particles deposited and dispersed in the $SiO_2/TiO_2$ matrix material. The film forming step was repeated ten times to obtain a glass base laminated with a fine metal particle dispersion film.

The composition of metal oxides and fine metal particles in the fine metal particle dispersed film was as follows. $SiO_2$ is 68.4 mass %, $TiO_2$ is 12.6 mass %, and Ag is 19.0 mass %. A TEM observation confirmed that substantially spherical isotropic fine Ag particles having an average particle diameter of approximately 20 nm were deposited and dispersed in the $SiO_2/TiO_2$ matrix material.

Next, a base material was cut from the glass base, and the base material was drawn with heating in a similar manner to Example 1. After cooling, a drawn portion was cut to obtain a polarization element as shown in FIG. 1.

In the polarization properties of the polarization element, the extinction ratio at a wavelength of 670 nm was 35 dB, and the insertion loss was 0.8 dB. A TEM observation confirmed that the aspect ratio of the fine metal particles of Example 2 was 1:3. No peeling was recognized at all between the laminated films.

Comparative Example 1

In Comparative Example 1, a polarization element was fabricated by a similar method to Example 2 except that the blending composition of the sol coating liquid was changed, as compared with Example 2.

The same silicon oxide stock solution and copper oxide stock solution as in Example 2 were used. 2.0 g of chloroauric acid (metal salt) and 54.2 g of IPA (solvent) were blended in a mixture of 43.8 g of silicon oxide stock solution and 0.05 g of copper oxide stock solution to prepare a sol coating liquid.

Next, after the sol coating liquid was dip coated on the surface of the glass substrate, a similar treatment to Example 2 was performed to form a fine metal particle dispersed film containing fine metal particles deposited and dispersed in the $SiO_2/CuO$ matrix material. The film forming step was repeated ten times to obtain a glass base laminated with the fine metal particle dispersed film.

The composition of metal oxides and fine metal particles in the formed fine metal particle dispersed film was as follows. $SiO_2$ is 83.9 mass %, CuO is 0.09 mass %, and Au is 16.0 mass %. A TEM observation confirmed that substantially spherical isotropic fine metal particles having an average particle diameter of approximately 8 nm were deposited and dispersed in the $SiO_2/CuO$ matrix material.

Next, a base material was cut from the glass base, and the base material was drawn with heating in a manner similar to Example 2. After cooling, a drawn portion of the base material was cut to obtain a polarization element as shown in FIG. 1. In the polarization properties of the polarization element, the extinction ratio at a wavelength of 620 nm was 5 dB, and the insertion loss was 0.1 dB. A TEM observation confirmed that the aspect ratio of the fine gold particles of Comparative Example 1 was 1:1.2. No peeling was recognized at all between the laminated films.

Comparative Example 2

In Comparative Example 2, a polarization element was fabricated by a similar method to Example 2 except that the blending composition of the sol coating liquid was changed, as compared with Example 2.

The same silicon oxide stock solution and copper oxide stock solution as in Example 2 were used. 2.0 g of chloroauric acid (metal salt) and 54.1 g of IPA (solvent) were blended in a mixture of 14.5 g of silicon oxide stock solution and 29.4 g of copper oxide stock solution to prepare a sol coating liquid.

Next, after the sol coating liquid was dip coated on the surface of the glass substrate, a similar treatment to Example 2 was performed to form a fine metal particle dispersed film containing fine metal particles deposited and dispersed in the $SiO_2/CuO$ matrix material. The film forming step was repeated ten times to obtain a glass base laminated with the fine metal particle dispersed film.

The composition of metal oxides and fine metal particles in the fine metal particle dispersed film was as follows. $SiO_2$ is 27.7 mass %, CuO is 56.3 mass %, and Au is 16.0 mass %. A TEM observation confirmed that fine gold particles deposited in the $SiO_2/CuO$ matrix material had large particle diameters, and the contours of particles did not clearly appear. A detailed observation on the glass base confirmed that coloring resulting from the absorption of plasmon due to the formation of the fine gold particles was not observed, and fine gold particles were deposited in the fine metal particle dispersed film.

Next, a base material was cut from the glass base, and the base material was drawn with heating in a similar manner to Example 2. After cooling, a drawn portion of the base material was cut to obtain a polarization element as shown in FIG. 1. The resulting device exhibited no remarkable polarization properties.

Comparative Example 3

Using the same glass substrate as in Example 1, a multi-layered structure comprised of dielectric layers (glass substrates) and fine metal particle film layers alternately laminated was fabricated on the surface of the glass substrate using a sputtering method. In Comparative Example 3, a sputter target was borosilicate glass (glass substrate), and fine metal particles were gold (Au).

First, a thin film layer of gold having a thickness of 20 nm was formed on the surface of the glass substrate using a sputtering method. Next, a dielectric thin film layer of borosilicate glass having a thickness of 150 nm was formed on the thin film layer of gold. The film forming step was repeated ten times to fabricate a multi-layered structure which had ten layers each comprised of the thin film layer of gold and the dielectric thin film layer of borosilicate glass.

Next, a base material was cut from the glass base, and the base material was drawn with heating in a manner similar to Example 1. After cooling, a drawn portion of the base material was cut to obtain a polarization element having the same shape as in Example 1. In the polarization properties of the polarization element, the extinction ratio at a wavelength of 800 nm was 30 dB, and the insertion loss was 0.9 dB. The polarization element of Comparative Example 3 has sufficient polarization properties. However, this polarization element is poor in adhesion of the metal thin film layer to the dielectric layer, and peeling was observed on interfaces between the metal thin film layers and dielectric layers.

Table 1 shows the types and loadings of fine metal particles and matrix materials, an average particle diameter of fine metal particles deposited and dispersed in the matrix material, and an aspect ratio of the fine metal particles after drawing with heating.

Also, Table 2 shows the polarization properties (extinction ratio and insertion loss) of the elements fabricated in Example 1 through Example 9 and Comparative Example 1 through Comparative Example 3.

TABLE 2-continued

|  | Extinction ratio | Insertion loss | Remark |
| --- | --- | --- | --- |
| Example 5 | 48 dB/1300 nm | 0.05 dB |  |
| Example 6 | 35 dB/800 nm | 0.03 dB |  |
| Example 7 | 45 dB/800 nm | 0.08 dB |  |
| Example 8 | 29 dB/950 nm | 0.9 dB |  |
| Example 9 | 35 dB/670 nm | 0.8 dB |  |
| Comp. ex. 1 | 5 dB/620 nm | 0.1 dB |  |
| Comp. ex. 2 | — | — | Unmeasurable |
| Comp. ex. 3 | 30 dB/800 nm | 0.9 dB | Peeling |

Consideration

It was confirmed from Example 1 through Example 9 and Comparative Example 1 through Comparative Example 3 that a fine metal particle dispersed film could be readily formed on the surface of a transparent substrate by the sol-gel method. Specifically, it was confirmed that a fine metal particle dispersed product (fine metal particle dispersed film) including fine metal particles deposited and dispersed in a matrix material could be formed by applying a sol coating liquid with heat treatment or electromagnetic wave processing, and then sintering the sol coating liquid. The formation of the fine metal particle dispersed film by the sol-gel method has the advantage of the ability to deposit and disperse a metal salt, which is the raw material of fine metal particles, in the sol coating liquid in the matrix material substantially completely as fine metal particles.

It was also confirmed that a fine metal particle dispersion could be readily fabricated by drawing with heating a fine metal particle dispersed film formed on the surface of a transparent substrate. Since the fabricated polarization element is an inorganic compound based polarization element, it has excellent durability to heat and abrasion, as compared with organic compound based polarization elements.

It was further confirmed that polarization elements developing good polarization properties can also be fabricated by

TABLE 1

|  | Fine metal microparticle | | Matrix material | | | | Average particle diameter $\phi$/nm | Aspect ratio |
| --- | --- | --- | --- | --- | --- | --- | --- | --- |
|  | Type | Loading (wt %) | Type | Loading (wt %) | Type | Loading (wt %) | | |
| Example 1 | Au | 15.0 | SiO$_2$ | 85.0 | — | 0.00 | 6 | 1.2 |
| Example 2 | Au | 15.0 | SiO$_2$ | 77.2 | CuO | 7.80 | 40 | 6.0 |
| Example 3 | Au | 15.0 | SiO2 | 77.2 | TiO$_2$ | 7.80 | 16 | 1.5 |
| Example 4 | Au | 26.3 | SiO$_2$ | 69.4 | CoO | 4.33 | 23 | 1.8 |
| Example 5 | Au | 15.0 | SiO$_2$ | 77.2 | CuO | 7.80 | 40 | 8.0 |
| Example 6 | Au | 17.6 | SiO$_2$ | 73.3 | TiO$_2$ | 9.12 | 23 | 3.8 |
| Example 7 | Au | 13.8 | SiO$_2$ | 71.7 | TiO$_2$ | 14.50 | 25 | 4.0 |
| Example 8 | Au | 14.6 | SiO$_2$ | 61.1 | TiO$_2$ | 24.30 | 28 | 5.2 |
| Example 9 | Ag | 19.0 | SiO$_2$ | 68.4 | TiO$_2$ | 12.50 | 20 | 3.0 |
| Comp. ex. 1 | Au | 16.0 | SiO$_2$ | 83.9 | CuO | 0.09 | 8 | 1.2 |
| Comp. ex. 2 | Au | 16.0 | SiO$_2$ | 27.7 | CuO | 56.30 | Unmeasurable | Unmeasurable |
| Comp. ex. 3 | Au | — | — | — | — | — | — | — |

TABLE 2

|  | Extinction ratio | Insertion loss | Remark |
| --- | --- | --- | --- |
| Example 1 | 6 dB/630 nm | 1.2 dB |  |
| Example 2 | 35 dB/960 nm | 0.1 dB |  |
| Example 3 | 18 dB/630 nm | 1.2 dB |  |
| Example 4 | 22 dB/670 nm | 0.6 dB |  | using silver (silver salt as a metal salt) as well as gold (gold salt as a metal salt) as fine metal particles.

It was further confirmed that a fine metal particle layer could be readily laminated by fabricating a fine metal particle dispersion (fine metal particle dispersed film) utilizing a sol-gel method. It was confirmed that the polarization element having the fine metal particle dispersion (fine metal particle dispersed film) laminated by utilizing the sol-gel method was free from peeling between the laminated films, and had an improved adhesion between the laminated films.

It was also confirmed that the particle diameters of fine gold particles deposited and dispersed in a matrix material were closely related to the aspect ratio. As the fine gold particles (fine metal particles) have larger particle diameters, the fine metal particles can be imparted larger shape anisotropy. It was confirmed that the particle diameters of the fine metal particles were closely related to the characteristics of a resulting polarization element, so that a variety of polarization elements having different characteristics could be implemented by controlling the particle diameters of the fine metal particles.

Particularly, it was confirmed from Example 2 through Example 9 that the particle diameters of fine metal particles deposited and dispersed in a matrix material could be controlled by changing the composition of a sol coating liquid. Specifically, it was confirmed that the particle diameters of the fine metal particles could be controlled by blending a metal compound of the second metal (a metal compound of copper, titanium or cobalt in Examples and Comparative Examples) in a sol coating liquid. It was further confirmed that the particle diameters of the fine metal particles could be controlled by changing the type or a blending amount of a metal compound of the second metal.

It was confirmed from Comparative Example 1 that the particle diameters of fine gold particles (fine metal particles) could be effectively increased when the blending amount of a metal compound of the second metal blended in a sol coating liquid was 0.09 mass %. Therefore, the blending amount of the metal compound of the second metal is preferably more than 0.1 mass %.

It was confirmed from Comparative Example 2 that the particle diameters of fine gold particles (fine metal particles) grew excessively so that the fine gold particles were not substantially carried when the blending amount of a metal compound of the second metal blended in a sol coating liquid was 56.30 mass %. Therefore, the blending amount of the metal compound of the second metal is preferably less than 50.0 mass %.

It was confirmed from Example 5 through Example 8 that as fine metal particle dispersed films were formed in recesses in the surface of a glass substrate, a force applied during heating and drawing effectively acted on fine metal particles so that the fine metal particles had larger aspect ratios. In this case, since a resulting polarization element has no laminated fine metal particle dispersed films, the polarization element is free from the disadvantage of peeled laminated films.

It should be apparent to those skilled in the art that the present invention may be embodied in many other specific forms without departing from the spirit or scope of the invention. Particularly, it should be understood that the invention may be embodied in the following forms.

Instead of a metal salt, fine metal particles may be originally dispersed and mixed in a matrix material.

In the first embodiment, a multi-layer sol coating liquid having a plurality of different types of sol coating liquids may be formed on the surface of a transparent substrate. In this case, fine metal particles in respective layers, or their aspect ratios may be changed by varying the types of fine metal particles in the respective layers, and the particle diameters of deposited and dispersed fine metal particles. As a result, it is possible to provide a polarization element having the polarization properties over a wide wavelength region.

In the first embodiment, a fine metal particle dispersion 13 may be additionally formed on a rear surface 12c of the transparent substrate.

In the second embodiment, a fine metal particle dispersion 13A may be formed on the surfaces 12a of walls 12b of the transparent substrate adjacent to the respective recesses.

In the second embodiment, the recesses are not limited in shape to stripes. The recesses may have opening surfaces in rectangle or circle, by way of example. In this case, the recesses are preferably designed such that the recesses, deformed by the heating and drawing, become sufficiently small with respect to a desired polarizing wavelength.

Therefore, the present examples and embodiments are to be considered as illustrative and not restrictive and the invention is not to be limited to the details given herein, but may be modified within the scope and equivalence of the appended claims.

What is claimed is:

1. A method for manufacturing a polarization element including a transparent substrate, the method comprising the steps of:
   forming a fine metal particle dispersed product containing a plurality of dispersed fine metal particles on a surface of the transparent substrate using a sol-gel method;
   drawing the fine metal particle dispersed product together with the transparent substrate with heating to produce a drawn fine metal particle dispersed product and transparent substrate; and
   cutting the drawn fine metal particle dispersed product and transparent substrate to produce the polarization element;
   wherein the step of forming a fine metal particle dispersed product includes the steps of:
      coating a sol coating liquid, containing a disperse liquid containing an organic silicon compound as a main component and a salt of a first metal dispersed in the disperse liquid for generating the fine metal particles, on the surface of the transparent substrate;
      treating with heating the sol coating liquid coated on the transparent substrate; and sintering the heat treated sol coating liquid coated on the transparent substrate, wherein the sol coating liquid further contains a metal compound of a second metal different from the first metal.

2. The method for manufacturing a polarization element according to claim 1, wherein the plurality of dispersed fine metal particles include at least one type of metal selected from the group consisting of gold, silver, copper, palladium, platinum and rhodium.

3. The method for manufacturing a polarization element according to claim 1, wherein the step of forming includes formation of the fine metal particle dispersed product on two opposing surfaces of the transparent substrate.

4. The method for manufacturing a polarization element according to claim 1, wherein the fine metal particle dispersed product is a fine metal particle dispersed film.

5. The method for manufacturing a polarization element according to claim 4, wherein the fine metal particle dispersed product is a fine metal particle dispersed multi-layered film.

6. The method for manufacturing a polarization element according to claim 1, wherein the organic silicon compound is alkoxysilane.

7. The method for manufacturing a polarization element according to claim 1, wherein the fine metal particle dispersed product contains 1 to 30 mass % of the fine metal particles.

8. The method for manufacturing a polarization element according to claim 1, wherein the second metal is at least one type of metal selected from the group consisting of zirconium, titanium, cerium, tin, bismuth, cobalt, copper, aluminum, magnesium, manganese, chromium, indium, vanadium, iron, nickel, zinc, tungsten, tantalum, hafnium, barium, ytterbium, niobium, molybdenum, yttrium, ruthenium, germanium, lead and boron.

9. The method for manufacturing a polarization element according to claim 1, wherein the fine metal particle dispersed product contains 0.1 to 50.0 mass % of metal oxide of the second metal.

10. A method for manufacturing a polarization element including a transparent substrate, the method comprising the steps of:

forming a fine metal particle dispersed product containing a plurality of dispersed fine metal particles on a surface of the transparent substrate using a sol-gel method;

drawing the fine metal article dispersed product together with the transparent substrate with heating to produce a drawn fine metal particle dispersed product and transparent substrate;

cutting the drawn fine metal particle dispersed product and transparent substrate to produce the polarization element; and forming a plurality of recesses as stripes on the surface of the transparent substrate;

wherein the step of forming a fine metal particle dispersed product includes the steps of:

coating a sol coating liquid, containing a disperse liquid containing an organic silicon compound as a main component and a salt of a first metal dispersed in the disperse liquid for generating the fine metal particles, on the surface of the transparent substrate;

treating with heating the sol coating liquid coated on the transparent substrate; and sintering the heat treated sol coating liquid coated on the transparent substrate, wherein the coating step includes coating the sol coating liquid in the plurality of recesses.

11. A method for manufacturing a polarization element including a transparent substrate, the method comprising the steps of:

forming a fine metal particle dispersed product containing a plurality of dispersed fine metal particles on a surface of the transparent substrate using a sol-gel method;

drawing the fine metal particle dispersed product together with the transparent substrate with heating to produce a drawn fine metal particle dispersed product and transparent substrate;

cutting the drawn fine metal particle dispersed product and transparent substrate to produce the polarization element;

wherein the step of forming a fine metal particle dispersed product includes the steps of:

coating a sol coating liquid, including a disperse liquid containing an organic silicon compound as a main component and a salt of a first metal dispersed in the disperse liquid for generating the fine metal particles, on the surface of the transparent substrate;

irradiating the sol coating liquid coated on the transparent substrate with an electromagnetic wave; and sintering the irradiated sol coating liquid coated on the transparent substrate, wherein the sol coating liquid further contains a metal compound of a second metal different from the first metal.

12. The method for manufacturing a polarization element according to claim 11, wherein the organic silicon compound is alkoxysilane.

13. The method for manufacturing a polarization element according to claim 11, wherein the fine metal particle dispersed product contains 1 to 30 mass % of the fine metal particles.

14. The method for manufacturing a polarization element according to claim 11, wherein the second metal is at least one type of metal selected from the group consisting of zirconium, titanium, cerium, tin, bismuth, cobalt, copper, aluminum, magnesium, manganese, chromium, indium, vanadium, iron, nickel, zinc, tungsten, tantalum, hafnium, barium, ytterbium, niobium, molybdenum, yttrium, ruthenium, germanium, lead and boron.

15. The method for manufacturing a polarization element according to claim 11, wherein the fine metal particle dispersed product contains 0.1 to 50.0 mass % of a metal oxide of the second metal.

16. A method for manufacturing a polarization element including a transparent substrate, the method comprising the steps of:

forming a fine metal particle dispersed product containing a plurality of dispersed fine metal particles on a surface of the transparent substrate using a sol-gel method;

drawing the fine metal particle dispersed product together with the transparent substrate with heating to produce a drawn fine metal particle dispersed product and transparent substrate;

cutting the drawn fine metal particle dispersed product and transparent substrate to produce the polarization element;

forming a plurality of recesses as stripes on the surface of the transparent substrate;

wherein the step of forming a fine metal particle dispersed product includes the steps of:

coating a sol coating liquid, including a disperse liquid containing an organic silicon compound as a main component and a salt of a first metal dispersed in the disperse liquid for generating the fine metal particles, on the surface of the transparent irradiating the sol coating liquid coated on the transparent substrate with an electromagnetic wave; and sintering the irradiated sol coating liquid coated on the transparent substrate, wherein the coating step includes coating the sol coating liquid in the plurality of recesses.

17. A polarization element, comprising:

a transparent substrate; and a fine metal particle dispersion formed on a surface of the transparent substrate, and including a plurality of dispersed fine metal particles, wherein the plurality of dispersed fine metal particles have shape anisotropy and the fine metal particle dispersion contains a first metal for forming the fine metal particles and a metal oxide of a second metal different from the first metal for forming the fine metal particles.

18. The polarization element according to claim 17, wherein the fine metal particle dispersion is one of a plurality of laminated fine metal particle dispersions.

19. The polarization element according to claim 17, wherein the fine metal particle dispersion contains a fine metal particle dispersed product having silicon oxide as a main component.

20. The polarization element according to claim 17, wherein the plurality of dispersed fine metal particles include at least one type of metal selected from the group consisting of gold, silver, copper, palladium, platinum and rhodium.

21. The polarization element according to claim 17, wherein the fine metal particle dispersion contains 1 to 30 mass % of the fine metal particles.

22. The polarization element according to claim 17, wherein the metal oxide of the second metal is at least one type of metal oxide selected from the group consisting of zirconium oxide, titanium oxide, cerium oxide, tin oxide, bismuth oxide, cobalt oxide, copper oxide, aluminum oxide, magnesium oxide, manganese oxide, chromium oxide, indium oxide, vanadium oxide, iron oxide, nickel oxide, zinc oxide, tungsten oxide, tantalum oxide, hafnium oxide, barium oxide, ytterbium oxide, niobium oxide, molybdenum oxide, yttrium oxide, ruthenium oxide, germanium oxide, lead oxide and boron oxide.

23. The polarization element according to claim 17, wherein the fine metal particle dispersion contains 0.1 to 50.0 mass % of the metal oxide of the second metal.

24. A polarization element, comprising:
   a transparent substrate; and
   a fine metal particle dispersion formed on a surface of the transparent substrate, and including a plurality of dispersed fine metal particles,
   wherein the plurality of dispersed fine metal particles have shape anisotropy and the transparent substrate includes a plurality of recesses formed as stripes on the surface,
   wherein the fine metal particle dispersion is formed in each of the recesses.

25. The polarization element according to claim 24, wherein the fine metal particle dispersion contains a fine metal particle dispersed product having silicon oxide as a main component.

26. The polarization element according to claim 24, wherein the plurality of dispersed fine metal particles include at least one type of metal selected from the group consisting of gold, silver, copper, palladium, platinum and rhodium.

27. The polarization element according to claim 24, wherein the fine metal particle dispersion contains 1 to 30 mass % of the fine metal particles.

28. The polarization element according to claim 24, wherein the fine metal particle dispersion contains a first metal for forming the fine metal particles and a metal oxide of a second metal different from the first metal for forming the fine metal particles.

29. The polarization element according to claim 28, wherein the metal oxide of the second metal is at least one type of metal oxide selected from the group consisting of zirconium oxide, titanium oxide, cerium oxide, tin oxide, bismuth oxide, cobalt oxide, copper oxide, aluminum oxide, magnesium oxide, manganese oxide, chromium oxide, indium oxide, vanadium oxide, iron oxide, nickel oxide, zinc oxide, tungsten oxide, tantalum oxide, hafnium oxide, barium oxide, ytterbium oxide, niobium oxide, molybdenum oxide, yttrium oxide, ruthenium oxide, germanium oxide, lead oxide and boron oxide.

30. The polarization element according to claim 28, wherein the fine metal particle dispersion contains 0.1 to 50.0 mass % of the metal oxide of the second metal.

* * * * *

UNITED STATES PATENT AND TRADEMARK OFFICE
CERTIFICATE OF CORRECTION

PATENT NO.    : 6,765,721 B2
DATED         : July 20, 2004
INVENTOR(S)   : Mitsuhiro Kawazu et al.

It is certified that error appears in the above-identified patent and that said Letters Patent is hereby corrected as shown below:

Column 26,
Line 41, after "transparent" and before "irradiating", insert -- substrate; --.

Signed and Sealed this

Fourteenth Day of December, 2004

JON W. DUDAS
*Director of the United States Patent and Trademark Office*